UNITED STATES PATENT OFFICE.

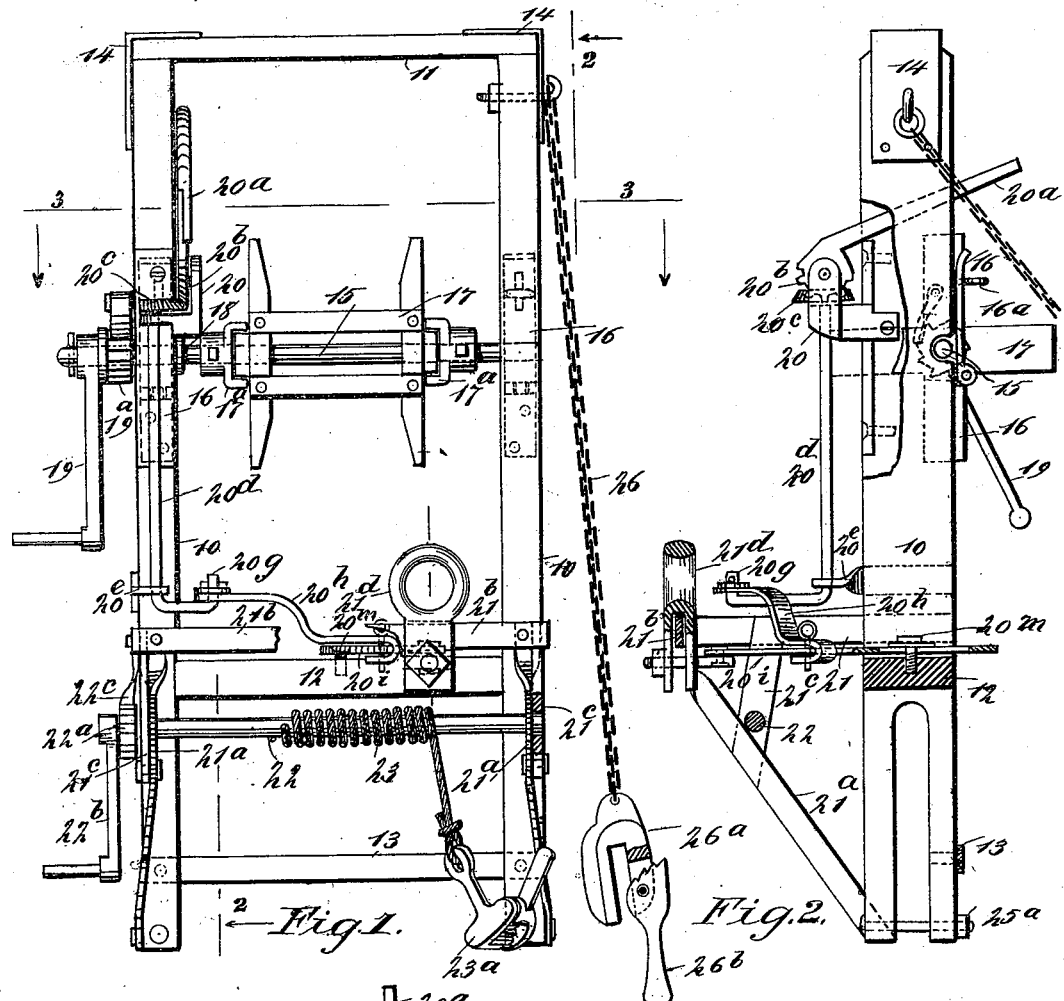

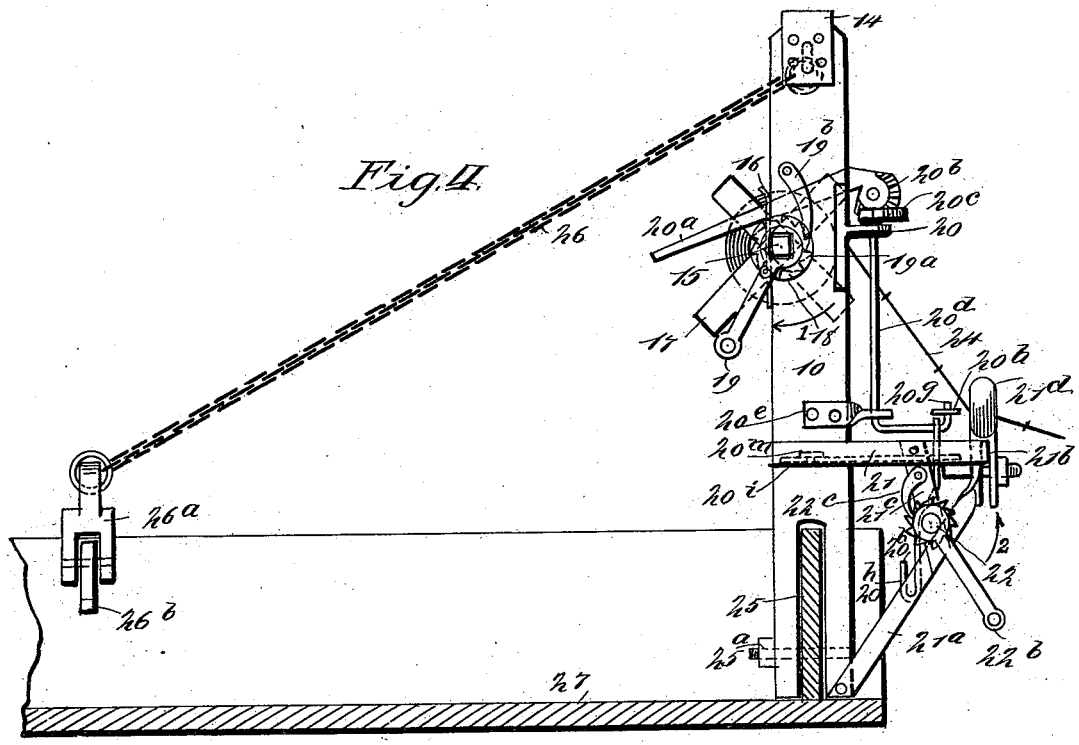

WILLIAM J. OPPER AND JOHN M. OPPER, OF KENESAW, NEBRASKA.

FENCE-WIRE REEL.

SPECIFICATION forming part of Letters Patent No. 511,542, dated December 26, 1893.

Application filed August 1, 1893. Serial No. 482,109. (No model.)

*To all whom it may concern:*

Be it known that we, WILLIAM J. OPPER and JOHN M. OPPER, of Kenesaw, in the county of Adams and State of Nebraska, have invented a new and useful Improved Fence-Wire Reel, of which the following is a full, clear, and exact description.

Our invention relates to an improved device for stretching fence wire, and also for taking up and reeling wire that has been extended as a fence, when the fence is to be removed; and has for its objects, to provide a novel, effective and convenient device of the type indicated, which is adapted for attachment to the body of the wagon, and that may be operated from the moving wagon, to pay out and stretch, or take up and smoothly reel wire that has previously been stretched.

To these ends, our invention consists in the construction and combination of parts, as is hereinafter described, and claimed.

Reference is to be had to the accompanying drawings, forming a part of this specification, in which similar figures of reference indicate corresponding parts in all the views.

Figure 1 is a front view of the device. Fig. 2 is a sectional side view on the broken line 2—2 in Fig. 1. Fig. 3 is a sectional plan view, on the line 3—3 in Fig. 1. Fig. 4 is a sectional side view in part, of a wagon body, and a side view of the improvement secured upon the end gate of the body and to one side board of the same, in position to pay out wire; and Fig. 5 is a rear view of the reeling device clamped upon the side of the wagon body and adapted to reel up wire.

The main frame portion of the improved wire reel, comprises two side bars 10, that are held spaced apart and parallel, by the top cross bar 11, intermediate cross bar 12, and metal brace bar 13, which is secured upon the bars 10 on their rear faces near the lower end of each bar, corner bands 14, being secured at the top as shown, to stiffen the frame.

At a suitable point between the cross-bars 11, 12, the reel carrying shaft 15, is journaled on the side-bars 10, at right angles thereto. Preferably the shaft 15 is loosely retained in place on the main frame, by locating it in notches cut in the side bars 10, shaped to serve as open boxes, and closed by the hinged cap-plates 16, which are adapted to fold over the shaft journals, one hinged section of each cap-plate being secured to the rear edges of the side bars by screws, and the folding parts detachably fastened to the same edges by the two buttons 16ª, or other means.

On the shaft 15, an ordinary wire holding frame or reel 17, is loosely mounted, and held to rotate with the shaft by the driving dogs 17ª as shown clearly in Figs. 3 and 5.

On a portion of the shaft 15, between a dog 17ª and one side bar 10 of the frame, a friction hub 18, is formed or secured, and upon a squared end of the shaft that projects beyond the outer surface of the said side bar, a crank handle 19, is placed for the manual rotation of the shaft.

Between the crank handle 19 and adjacent side of the frame bar 10, a ratchet wheel 19ª, is secured on the shaft 15, the teeth of which are engaged by the pivoted pawl 19ᵇ, the teeth hooking in a direction that will adapt the pawl to lock the shaft from reverse rotation when it is revolved in the direction of a curved arrow 1, in Fig. 4.

Near to the friction hub 18, a bracket arm 20, is secured upon the frame side bar 10, which arm has a horizontal flat member and a vertical flange composing its supporting portions.

On the front side of the main frame, below the shaft 15, a bracket frame is located, which consists of the two horizontal side bars 21, that project in the same horizontal plane from the main frame side bars 10, and have an equal length. The bars 21, are sustained in position by the inclined braces 21ª that project from the lower ends of the side bars 10, in an upward and outward direction, to have their upper ends affixed upon a transverse guide bar 21ᵇ which is joined at its ends to the ends of the horizontal bars 21.

Between a horizontal frame bar 21, and its brace 21ª on each side of the bracket frame they are members of, a brace piece 21ᶜ is attached by its ends to said parts, and these similar braces which are oppositely located at a proper distance from the front edges of the side bars 10, have opposite perforations produced in them for the loose reception of a counter-shaft 22. The rotatable counter-shaft 22, is projected at one end beyond its support, to receive the ratchet wheel 22ª which is affixed upon said projected portion, and outside of the ratchet wheel, a crank handle 22$^b$ is removably attached upon the countershaft. The counter-shaft 22, is designed to afford means for the taut stretching of the fence wire that has been unwrapped from the reel 17, as will be further explained; and to this end a flexible connection such as a rope 23, is affixed by one end to the shaft and wrapped thereon when in use for the purpose mentioned, the counter-shaft being rotated in the direction of the curved arrow 2 in Fig. 4, so that the pawl 22$^c$ which is pivoted upon the bracket frame and engages with the teeth of the ratchet wheel 22$^a$, will be adapted to retain the shaft 22 from a reverse rotation when this is necessary. There is a segmental bevel gear 20$^b$ formed on or secured to the lever 20$^a$ concentric with the pivot support of the latter, which segmental gear is meshed with a similar gear segment 20$^c$ that is secured on the upper end of the vertical shaft 20$^d$ which loosely projects through the horizontal member of the bracket arm 20, whereon the gear segment 20$^c$ is seated. The shaft 20$^d$ is loosely supported below, parallel with the front edge of the main frame side bar 10, by an arm 20$^e$ through which the shaft projects, there being a lateral extension of said shaft produced below and near to the arm 20$^e$, having a journal post 20$^g$ formed on its free end, and upwardly projected to have a pivotal connection with a link bar 20$^h$ loosely secured by its other end to a lever 20$^i$ which is loosely joined to the lower portion of the furcated lower end of the traveler block 21$^d$, which forked portion is made to embrace loosely the guide bar it rests upon. The rearward portion of the lever 20$^i$ is longitudinally slotted for a suitable length, loosely to receive a fulcrum bolt 20$^m$ screwed into the transverse main frame bar 12, whereon the lever is imposed and adapted to slide, when the described mechanism for operating the block 21$^d$ is in service.

The traveler block 21$^d$ is furnished with a ring-eye on its upper end, through which the fence wire is passed that is to be removed from the reel 17 and stretched along a line of posts in a field to form a wire fence, the eye in the block being large enough to pass barbed wire freely through it, as indicated at 24, in Figs. 4. and 5.

The side bars 10 of the main frame of the improved reeling device, have longitudinal slots through and from their lower ends, of a proper length to allow the furcated portions of the bars to slide upon and embrace the end-gate 25, as shown in Fig. 4, and be thereto secured by the bolts 25$^a$, this position being given to the wire reeling device when fence wire on the reel 17 is to be paid out and stretched in the erection of a new fence or the repairing of an old one. When the main frame of the novel wire stretching device is secured in position on the said end gate 25, a stay chain or rope 26 is extended from the top of the main frame forwardly, and is clamped to one side board of the wagon body 27, by the clamp 26$^a$ which is preferably constructed as shown in Figs. 1, 4 and 5 and comprises a furcated block furnished with a laterally projecting pivoted cam dog 26$^b$ which works through a slot in one limb of the block, and will engage by serrations on its curved face with the side board embraced by the parallel spaced limbs of the clamping block.

If the device is to be used to erect a wire fence, a spool or reel-frame containing a supply of coiled fence wire is placed on the shaft 15, which is loosely mounted on the main frame bars 10 as before explained, these bars having been clamped upon the end gate 25, so that the wire may be extended from the rear end of the wagon body 27, after it has been inserted through the ring-eye of the traveler block 21$^d$. The wagon being occupied by a driver and a reel operator, is now moved into position at one end of the line of posts (not shown), whereon the fence wire is to be affixed, and the free terminal of the wire strand 24, is attached to the end post of the series. The forward movement of the wagon of which 27 is the body, along the line of posts away from the one on which the wire is attached, will uncoil the latter from the reel 17.

To facilitate the unwrapping of the wire, the link 20$^h$ is released from the lever 20$^i$, and permitted to hang pendent, as indicated in Fig. 4; this will allow the traveler block 21$^d$ to slide back and forth on the guide bar 21$^b$, so as to guide the wire strand as it unwraps from the reel frame; and in order to stretch the wire and prevent its too free delivery from the reel frame the lever 20$^a$ is pressed downwardly upon the hub 18, its frictional contact with which serves to restrain the out-put of the fence wire, which may thus be paid out along a fence line of considerable length.

When the extended wire strand is to be fastened to the line of posts, it may be rendered taut by the use of the rope 23, and the clamp block 23$^a$ that is secured on the outer end of the rope, as shown in Fig. 1, said block being attached to the fence wire line near the wagon after the rope has been unwrapped from the counter-shaft 22, the rotation of the latter in the direction indicated by arrow 2 in Fig. 4, serving to draw taut the fence wire, which may then be secured to the line of posts in the ordinary way.

To reel up a line of fence wire that has been detached from its supporting posts, so that the wire may be reused when required, the improved reeling device is secured upon the inner surface of the wagon body 27, the left side of the main frame being bolted thereto as shown in Fig. 5, the traveler block 21$^d$ in this case being located facing the front end of the wagon body, so as to receive the fence wire that is in advance of the wagon.

The proper disposal of the wire that is being taken up with the reeling device, is effected by the use of the controlling mechanism for the traveler block 21ᵈ, and the link bar 20ʰ being now pivotally secured to the slotted lever 20ⁱ as represented in Figs. 3 and 5, adapts the lever 20ᵃ to slide the traveler block when it is vibrated.

The location of the reeling device upon the side board of the wagon body, permits the operator to face the front while he stands in the wagon and rotates the crank of the reel. It also permits the frame of the device to be supported by the chain 26, which is extended therefrom rearwardly and is clamped to the same side of the body as is the reeling device. This changing of position for the reel frame is necessary, for if the frame be clamped upon the end gate 25, while draft strain is from the front, as is the case when extended wire is being reeled up, the operator would be obliged to work the reel crank at a great disadvantage, and he could not manipulate, the lever 20ᵃ, neither could the stay chain be extended oppositely from the direction of draft strain. Furthermore, the person working at the reel, would have his back toward the front of the wagon, and therefore could not see the wire that is being reeled, which is essential to the operation of reeling it.

It will be seen that to reel a line of fence wire, the operator grasps the crank handle 19, while he stands at the rear side of the reeling device, and with the other hand manipulates the lever 20ᵃ which will enable him to dispose the wire as he reels it in neat successive layers on the reel frame, the ratchet wheel 19ᵃ and pawl 19ᵇ that engages said wheel preventing the reverse movement of the crank handle and shaft 15, which are moved in the direction of the curved arrow 1 in Fig. 4, when the device is used for the purpose last explained.

Having thus fully described our invention, we claim as new and desire to secure by Letters Patent—

1. In a wire reeling device, the combination with a frame work, and a reel, of a sliding block having a guide eye for the wire, a lever pivoted to the block and free to move with the slide block, a rock shaft, a link connecting the rock shaft with the lever, and means for rocking the shaft, substantially as described.

2. In a wire reeling device the combination with a frame work, and a reel, of a horizontal sliding block mounted on a guide bar and having a guide eye for the wire, a sliding lever pivoted to the slide block, a vertical rock shaft having a bent lower end, a link connecting the sliding lever to the bent end of the rock shaft, a toothed segment on the upper end of the rock shaft, and a lever having a toothed segment in mesh with the segment of the rock shaft, substantially as described.

3. The combination with the reel and its frame, the latter having a horizontal bar, of a sliding block furcated to receive said bar, and held to the latter, a lever pivoted to said block and having a longitudinal slot, a bolt engaging the slotted portion of the lever, a rock shaft, a link connecting the slotted lever with the rock shaft, a toothed segment on the rock shaft, and a lever having a toothed segment in mesh with the segment of the rock shaft, substantially as described.

4. The combination with the frame work and a reel, of a stay chain secured to the frame, and provided at its free end with a clamp consisting of a furcated block adapted to fit over the side of a wagon, and a cam dog pivoted to the furcated block, and adapted to clamp the latter in place, substantially as described.

WILLIAM J. OPPER.
JOHN M. OPPER.

Witnesses:
E. N. HAMEN,
U. S. ROHRER.